W. G. MOORE.
TRANSMISSION GEAR.
APPLICATION FILED JUNE 17, 1914.
1,194,654.
Patented Aug. 15, 1916.
2 SHEETS—SHEET 2.
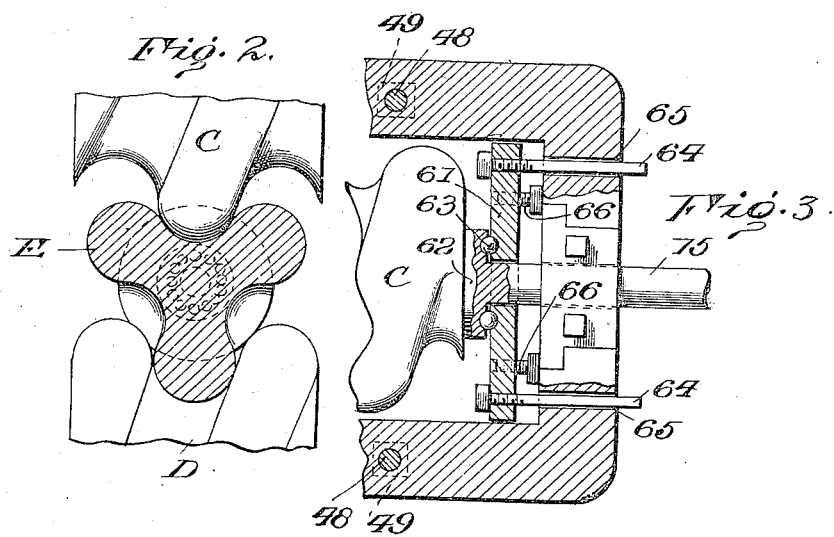
Witnesses
C. T. Landon
W. A. Williams
Inventor
W. G. Moore
By
H. A. Moore, Attorneys.

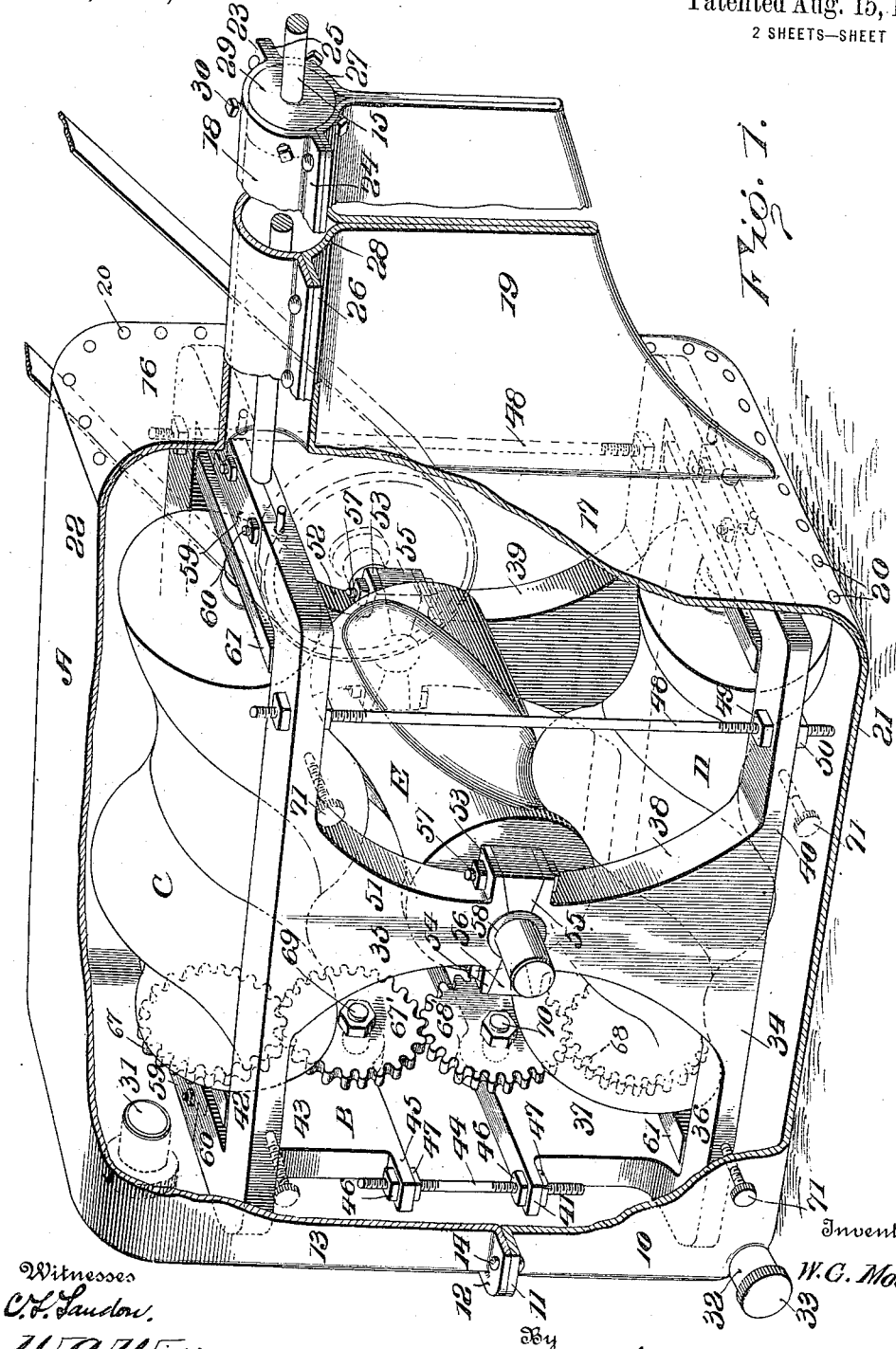

UNITED STATES PATENT OFFICE.

WILBER G. MOORE, OF BELLVILLE, OHIO.

TRANSMISSION-GEAR.

1,194,654.  Specification of Letters Patent.  Patented Aug. 15, 1916.

Application filed June 17, 1914. Serial No. 845,674.

*To all whom it may concern:*

Be it known that I, WILBER G. MOORE, citizen of the United States, residing at Bellville, in the county of Richland and State of Ohio, have invented certain new and useful Improvements in Transmission-Gears, of which the following is a specification.

My invention relates to new and useful improvements in transmission gears, and aims as its principal object to provide a transmission of the worm and worm wheel type, embodying as its essential features of construction a pair of parallel spaced worms which are arranged to mesh with a driven worm interposed between them and extending at right angles to their longitudinal axes.

A further object is to so dispose the driving worms and driven worm that the force exerted upon the latter element is continuous and uniform, this desirable result being accomplished by so arranging the driving worms that they counter-balance each other.

A further object is to provide a simple but efficient supporting frame or bed in which the driving worms or driven worm may be quickly and easily positioned or from which they may be as readily removed.

Another object is to provide for the driving worms and driven worm a bed which is formed in two sections coupled by adjustable means whereby they may be re-arranged at will to support the driving worm shafts at an angle to each other instead of in parallel relation.

A still further object of my invention is the provision of a casing for the bed of the transmission, which casing is formed in two sections adapted to be united to form a lubricant chamber so that the worms may be operated in a lubricant bath.

The above recited and other incidental objects of a similar nature, which will be hereinafter more specifically treated, are accomplished by such means as are illustrated in the accompanying drawings, described in the following specification, and then more particularly pointed out in the claims, which are appended hereto and form a part of this application.

With reference to the drawings, wherein there has been illustrated the preferred embodiment of this invention as it is reduced to practice, and throughout the several views of which similar reference characters designate corresponding parts, Figure 1 is a perspective view of the transmission with the various elements thereof in operative assembled relation. In this figure a portion of the cover is removed to afford an interior view whereby the assembled relation of the worms may be readily appreciated. Fig. 2 is a detail fragmentary view of the driving worms and driven worm, this latter element being shown in transverse section, illustrating clearly the manner in which the worms mesh; and Fig. 3 is a detail view showing in horizontal section one of the bearings in which the worm shafts are mounted at the ends of the bed, and disclosing also the spacer bars employed in spacing the terminals of the worms from the bed.

The preferred embodiment of my invention, which is best illustrated in Fig. 1 of the drawings, includes as its essential features of construction a casing or housing A, a bed B, which is arranged therein, a pair of parallel driving worms C and D, which are journaled in the bed and extend longitudinally thereof, and a driven worm E, which is interposed between the worms C and D and is journaled to extend transversely of the bed and, consequently, at right angles to the longitudinal axes of the worms.

The casing or housing A is preferably formed in two sections, each of which comprises a metallic casting of a substantially rectangular conformation. The lower section, designated by the numeral 10, is provided at its upper open end with a peripheral outwardly extending coupling flange 11 which is adapted to serve as a support for a similar flange 12 carried by the lower open end of the upper section 13. Bolts, indicated at 14, are, of course, employed in connecting the flanges 11 and 12 so that the two sections 10 and 13 of the housing are held in the proper assembled relation to each other.

In order that a portion of the driving shaft 15 may be received within the housing A, the front wall 16 of the upper section 13, and the front wall 17 of the lower section 10, are provided with the extensions 18 and 19, respectively. At this point it is desirable to explain that the members 16 and 17 are secured as by bolts 20 to the forward edges of the top and bottom walls 21 and 22, respectively of the housing sections 10 and 13. The member 18 is substantially semi-circular and is provided with outwardly extending flanges 23 and 24, which are mounted upon the similar flanges 25 and 26 of the section 19. It will be obvious that the section 19 is of double thickness, consisting in reality in a folded sheet or plate of metal, the free edges of which are each curved to form the arcuate portions 27 and 28. Obviously these arcuate portions 27 and 28 produce a semi-circular channel, and in connection with the member 18 produce a cylindrical casing receiving the shaft 15. A circular brass bearing 29 is arranged at the outer end of this cylindrical casing, being held in place by set-screws 30 or some equivalent fastening devces. An inlet tube, indicated at 31, is provided with a removable closure cap so that lubricant may be poured into the housing A at desired periods.

In order to permit the draining of the housing A so that a new quantity of lubricant may be employed whenever desired, a draining tube, indicated at 32, is provided. A threaded closure cap, indicated at 33, is, of course, provided for this member 32.

The bed or supporting frame in which the worms are mounted, as previously explained, is also formed in two sections, which will be hereinafter individually designated by the numerals 34 and 35. The members 34 and 35 being similar in construction, it is deemed necessary to describe only one of them in detail, the lower section of the bed being chosen in this instance. This lower section 34 is formed as a single metallic casting and includes a base frame 36 which is substantially rectangular in shape, a head block 37 which rises vertically from the rear transverse member of the frame 36, and a pair of bearing blocks 38 and 39, which latter extend vertically from the approximate centers of the longitudinal side members 40 of the base frame 36. From each terminal and at the upper edge of the head block extends a horizontally disposed apertured lug 41. It is now to be observed that the upper section 35 of the bed includes a base frame 42 and head block 43 which depends from the rear terminal thereof and is arranged in vertical alinement with the member 37.

As a means for spacing the members 43 and 37 a proper distance I preferably employ the threaded rods, indicated at 44. One of these rods 44 is passed through the vertically alined lugs 41 and 45 at each side of the bed. A pair of nuts, indicated at 46 and 47, are threaded on both the upper and lower terminals of each of the rods, and are arranged to bear against opposite sides of the contiguous members 41 and 45 so that the members 43 and 37 are not only supported in the desired spaced relation but the rods 44 are held against rotation. It will be obvious that by adjusting the nuts 46 and 47 the distance included between the upper and lower edges respectively of the head blocks 43 and 37 may be readily varied to increase or decrease the force with which the worms C and D engage the worm E. Rods 48 are provided for each side member of the base frames 42 and 36 adjacent the forward terminals thereof for properly supporting and spacing the forward ends of the base frames. A pair of nuts, indicated at 49 and 50 are threaded on each terminal of each member 48 for the same purpose above described in connection with the nuts 46 and 47.

It is, of course, obvious that it is necessary to provide some means for properly spacing the respective upper and lower terminals of the bearing blocks 38 and 39 and 51 and 52 so that, when the nuts of the rods 44 and 48 are manipulated to vary the space between the base frames 42 and 36, the bearing blocks may be properly supported one upon the other. For this purpose, therefore, the free terminals of the members 38 and 39, 51 and 52 are each provided with a pair of laterally extending wings or projections 53 and 54. The lower faces of these members 53 and 54 of each of the bearing blocks are beveled to converge toward an approximate central point of the bearing blocks, thus providing in effect for each of these members a substantially wedge-shaped terminal. Between the abutting members 53 and 54 of the bearing blocks 38 and 51 and 39 and 52 are interposed a pair of wedge-shaped spacer blocks, indicated at 55 and 56. These members 55 and 56 are held in the proper position by means of the vertical stay bolts 57 which are passed through the wing members and spacer blocks in a manner shown particularly in Fig. 1. A bronze bearing 58 is, of course, inserted between the inner terminals of the members 55 and 56 and the points of the abutting terminals of the bearing blocks.

It will now be obvious that by properly adjusting the nuts of the rods 44 and 48 and interposing between the abutting terminals of the bearing blocks 38 and 51 and 39 and 52 spacer blocks of different thicknesses, the shafts of the worms C and D may be arranged at any desired angle to each other instead of in parallel relation, as in Fig. 1. The shaft 15 of the worm C and the shaft of the lower worm D are respectively journaled, as shown in Fig. 1, in the transverse end members of the base frames 42 and 36 respectively. As a means for properly securing the terminals of these worm shafts I preferably employ for each terminal of each shaft a half bearing plate 59 which is substantially T-shaped and is let into a proper recess formed in the end member of the base frame to which it is attached. Bolts, indicated at 60, are employed in properly securing these half bearing plates 59 in position.

It is obvious that it is necessary to provide some means for adjusting the worms C and D longitudinally in the base frames 42 and 36 to insure the proper meshing of the worms with the worm E. For this purpose, therefore, I employ for each terminal of the worms C and D the adjustable spacer plates, indicated at 61. One of these members 61 is illustrated particularly in the sectional view of Fig. 4, and reference will, therefore, now be had to this figure. It will be seen that the plate 61 is approximately equal in length to the distance between the side members of the base frame and that it is provided with a central opening which freely receives the shaft of the worm. Between the terminal bosses 62, which are formed on the ends of the driving worms, and the members 61 are interposed ball bearings 63 which are seated in annular raceways formed in the adjacent faces of these members 61 and 62. A pair of guide pins, indicated at 64, is provided for each spacer plate, being threaded therethrough. These pins are adapted to be freely received within bores 65 which are formed in the end members of the base frames 42 and 36 and act to hold the spacer plates against rotation.

In order to provide means for adjusting the space between the members 61 and the adjacent end member of the base frame to which it is attached, I provide the spacing screws 66. These screws 66 are threaded into the members 61 from the outer faces thereof, and are provided with enlarged heads which are adapted to bear against the inner face of the adjacent end member of the base frame. It will be apparent that by manipulating the spacing screws 66 the plates 61 may be held at various distances from the end of the base frame in which the worm is journaled.

As has been hereinbefore explained, I have provided in connection with a transversely extending worm E a pair of worms C and D, instead of employing, as in the usual worm transmission but a single driving worm. The purpose previously attributed to this particular construction is to obtain a uniform and uninterrupted transmission of the power from the drive shaft 15 to the driven worm. It is, therefore, necessary to operatively connect the worms C and D so that they will revolve at corresponding speeds at all times, otherwise they would have a retarding effect on the rotation of the driven worm. I, therefore, connect the worms C and D to each other by a train of gears which, as shown in Fig. 1, includes a pair of terminal gears 67 and 68, the individual members of which are respectively connected to the shafts of the worms C and D and a pair of intermediate idler gears 67' and 68'. These members 67' and 68' are freely mounted on the inwardly extending stub axles 69 and 70 which are carried by the head blocks 43 and 37 respectively. After the preferred form of transmission has been positioned within the casing A, set-screws 71 are threaded through the upper and lower sections of the casing and engaged with the side members of the base frames 36 and 42 for properly positioning the bed in spaced relation to the walls of the casing or housing.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined in the appended claims.

Having thus described the invention, what is claimed as new is:—

1. A transmission including a sectional housing, a bed removably mounted therein, said bed consisting in two separate sections, adjustable means connecting the sections, spacer blocks interposed between the sections whereby they may be vertically adjusted to increase or decrease the space between them, a driven worm journaled transversely in the bed, a pair of parallel spaced driving worms arranged on diametrically opposite sides of the driven worm and journaled longitudinally in the bed, and adjustable spacer blocks bearing against the terminals of the driving worms whereby they may be adjusted to increase or decrease the radial thrust thereof against the driven worm.

2. A transmission including a sectional bed, a driving worm mounted upon each section of the bed, means connecting the said sections, a driven worm mounted between confronting terminals of the sections and engaged by the driving worms, and means for adjusting the inclination of the driving worms relative to the driven worm.

3. A transmission including a bed formed of sections each provided with spaced bearing blocks, the bearing blocks of one section confronting the bearing blocks of the other section, a driven worm mounted between the said confronting bearing blocks, a driving worm carried by each section of the bed and engaging the driven worm, means connecting the sections, and means interposed between the said bearing blocks for adjusting the inclination of the driving worms relative to the driven worm.

4. A transmission including a sectional bed, plates adjustable upon the ends of each section of the bed, a driving worm carried by the plates of each section and adjustable therewith longitudinally of the bed, a driven worm mounted between confronting terminals of the bed sections, and means connecting the sections of the bed.

5. A transmission including a sectional bed, plates arranged adjacent the ends of each section, pins carried by said plates and engaging the respective ends of the sections for slidably supporting the plates upon the sections, a driving worm carried by the plates of each section and adjustable thereon longitudinally of the bed, a driven worm mounted between confronting terminals of the bed sections, and means connecting the sections of the bed.

6. A transmission including intermeshing driving and driven worms, and means for adjusting the longitudinal inclination of one of said worms relative to the other, said means providing a bearing for the driven worm.

7. A transmission including intermeshing driving and driven worms, means for adjusting one of said worms relative to the other for varying the thrust of the driving worm with respect to the driven worm, and means for adjusting the longitudinal inclination of one worm relative to the other.

8. A transmission including a sectional bed, a driving worm mounted upon each section of the bed, a driven worm supported by the bed and engaged by the driving worms, and means for adjusting the sections of the bed relative to each other for positioning the driving worms radially with respect to the driven worm to vary the engagement therebetween.

9. A transmission including intermeshing driving and driven worms, and means for adjusting the driving worm radially with respect to the driven worm to vary the engagement therebetween.

In testimony whereof I affix my signature in presence of two witnesses.

WILBER G. MOORE. [L. S.]

Witnesses:
I. J. HOWARD,
FRANK G. PALMER.

Copies of this patent may be obtained for five cents each, by addressing the "Commissioner of Patents, Washington, D. C."